United States Patent
Son et al.

(10) Patent No.: US 7,859,502 B2
(45) Date of Patent: Dec. 28, 2010

(54) ARRAY SUBSTRATE OPERABLE IN DUAL-PIXEL SWITCHING MODE, DISPLAY APPARATUS HAVING THE SAME AND METHOD OF DRIVING THE DISPLAY APPARATUS

(75) Inventors: Jong-Ho Son, Seoul (KR); Dong-Hoon Chung, Suwon-si (KR); Sung-Hwan Hong, Suwon-si (KR); Myeong-Ha Kye, Seoul (KR); Il-Kook Huh, Yongin-si (KR)

(73) Assignee: Samsung Electronics Co. Ltd., Suwon-Si, Gyeonggi-Do (KR)

( * ) Notice: Subject to any disclaimer, the term of this patent is extended or adjusted under 35 U.S.C. 154(b) by 1101 days.

(21) Appl. No.: 11/517,223

(22) Filed: Sep. 7, 2006

(65) Prior Publication Data
US 2007/0164960 A1 Jul. 19, 2007

(30) Foreign Application Priority Data
Jan. 19, 2006 (KR) .................. 10-2006-0005956

(51) Int. Cl.
G09G 3/36 (2006.01)
(52) U.S. Cl. ....................................... 345/92
(58) Field of Classification Search ............ 345/92, 345/87, 210; 349/129
See application file for complete search history.

(56) References Cited

U.S. PATENT DOCUMENTS

| | | | | |
|---|---|---|---|---|
| 5,012,228 A * | 4/1991 | Masuda et al. | ........... | 345/88 |
| 6,853,407 B2 * | 2/2005 | Sato et al. | ........... | 349/43 |
| 7,333,170 B2 * | 2/2008 | Baek | ........... | 349/141 |
| 7,375,706 B2 * | 5/2008 | Shih et al. | ........... | 345/87 |
| 2003/0214470 A1 * | 11/2003 | Sun | ........... | 345/87 |
| 2005/0036091 A1 * | 2/2005 | Song | ........... | 349/129 |
| 2005/0134539 A1 * | 6/2005 | Jang | ........... | 345/92 |
| 2006/0146242 A1 * | 7/2006 | Kim et al. | ........... | 349/129 |
| 2006/0192739 A1 * | 8/2006 | Shin et al. | ........... | 345/90 |
| 2008/0212013 A1 * | 9/2008 | Kitagawa et al. | ........... | 349/187 |

FOREIGN PATENT DOCUMENTS

| JP | 2005-258417 | 9/2005 |
|---|---|---|
| KR | 1020030028971 | 4/2003 |

* cited by examiner

*Primary Examiner*—Chanh Nguyen
*Assistant Examiner*—Kwang-Su Yang
(74) *Attorney, Agent, or Firm*—F. Chau & Associates, LLC

(57) ABSTRACT

An array substrate includes a base substrate and a plurality of pixels on the base substrate. Each pixel includes a data line, first and second gate lines, first to third switching devices, and first and second pixel electrodes. The first and second gate lines cross the data line, and the second gate line is spaced apart from the first gate line. The first switching device is electrically connected to an adjacent gate line corresponding to an adjacent pixel. The second switching device is electrically connected to the data line and the first gate line. The third switching device is electrically connected to the data line and the second gate line. The first pixel electrode is electrically connected to the first and second switching devices, and the second pixel electrode is electrically connected to the first and third switching devices. The second pixel electrode is spaced apart from the first pixel electrode.

24 Claims, 9 Drawing Sheets

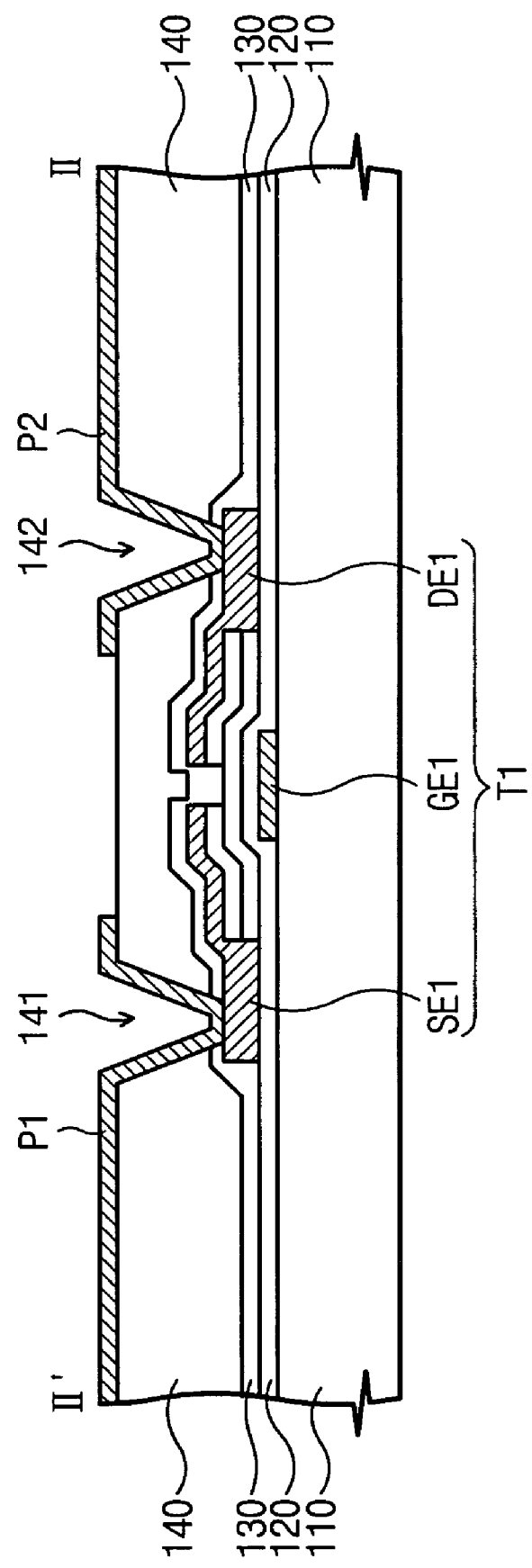

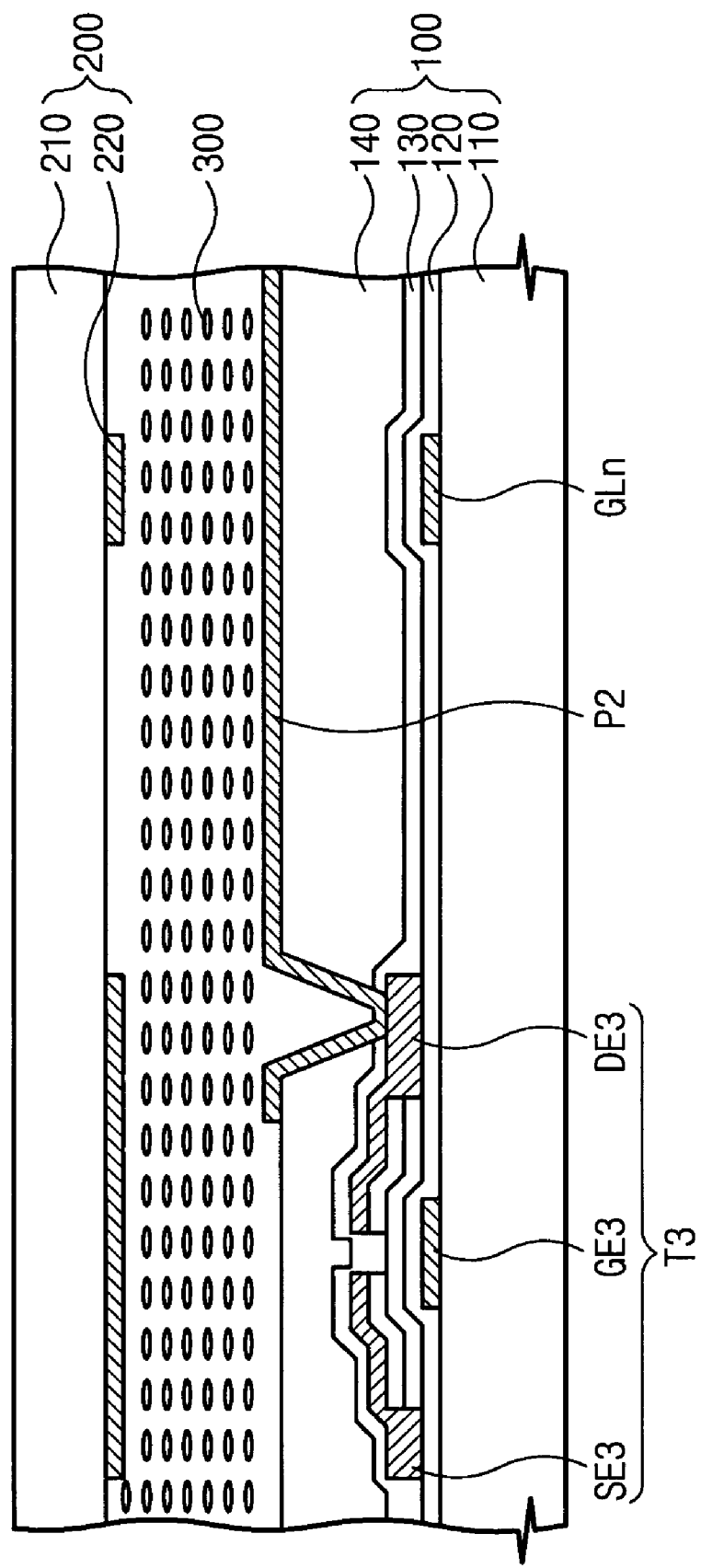

ARRAY SUBSTRATE OPERABLE IN DUAL-PIXEL SWITCHING MODE, DISPLAY APPARATUS HAVING THE SAME AND METHOD OF DRIVING THE DISPLAY APPARATUS

CROSS-REFERENCE TO RELATED PATENT APPLICATION

This application claims priority to Korean Patent Application No. 2006-5956, filed on Jan. 19, 2006, the contents of which are herein incorporated by reference in its entirety.

BACKGROUND OF THE INVENTION

1. Technical Field

The present invention disclosure relates to an array substrate, a display apparatus having the same and a method of driving the display apparatus. More particularly, the present invention disclosure relates to an array substrate operable in a dual-pixel switching mode, a liquid crystal display apparatus having the array substrate and a method of driving the liquid crystal display apparatus.

2. Discussion of the Related Art

A liquid crystal display apparatus includes a liquid crystal panel having an array substrate, a facing substrate and a liquid crystal layer interdisposed between the two substrates.

An array substrate for use in an in-plane switching liquid crystal display apparatus has a plurality of common electrodes to which a common voltage is applied and a plurality of pixel electrodes to which a data voltage having a positive polarity or a negative polarity with respect to the common voltage is applied. The polarity of the data voltage is inverted every frame with respect to the common voltage. When an electric field is formed between the common electrode and the pixel electrode, the liquid crystal molecules of the liquid crystal layer are aligned along the direction of the electric field.

Although the data voltage has a voltage level between 0 and 10 volts, there is an electric potential difference of about 5 volts between the common voltage and the data voltage which is applied to the liquid crystal layer. In order to increase the potential difference between the common voltage and the data voltage, the distance between the common electrode and the pixel electrode may be reduced. However, when the distance between the common electrode and the pixel electrode is reduced, the aperture ratio of the liquid crystal display apparatus is degraded.

SUMMARY OF THE INVENTION

The present invention provides an array substrate capable of improving an aperture ratio and a charging ratio.

The present invention also provides a display apparatus having the above array substrate.

The present invention also provides a method suitable for driving the above display apparatus.

According to an exemplary embodiment of the present invention, an array substrate includes a base substrate and a plurality of pixels on the base substrate. Each pixel comprises a data line, a first gate line, a second gate line, a first switching device, a second switching device, a third switching device, a first pixel electrode and a second pixel electrode. The first gate line crosses and is electrically insulated from the data line, and the second gate line crosses and is electrically insulated from the data line. The second gate line is spaced apart from the first gate line. The first switching device is electrically connected to a previous gate line corresponding to a previous pixel. The second switching device is electrically connected to the first gate line and the data line. The third switching device is electrically connected to the second gate line and the data line. The first pixel electrode is electrically connected to the first switching device and the second switching device, and the second pixel electrode is electrically connected to the first switching device and the third switching device. The second pixel electrode is spaced apart from the first pixel electrode.

According to an exemplary embodiment of the present invention, a display apparatus includes an array substrate having a plurality of pixels, a facing substrate disposed opposite to the array substrate and a liquid crystal layer interdisposed between the array substrate and the facing substrate. Each pixel comprises a data line, a first gate line, a second gate line, a first switching device, a second switching device, a third switching device, a first pixel electrode and a second pixel electrode. The first gate line crosses and is electrically insulated from the data line, and the second gate line crosses and is electrically insulated from the data line. The second gate line is spaced apart from the first gate line. The first switching device is electrically connected to a previous gate line corresponding to a previous pixel. The second switching device is electrically connected to the first gate line and the data line. The third switching device is electrically connected to the second gate line and the data line. The first pixel electrode is electrically connected to the first switching device and the second switching device, and the second pixel electrode is electrically connected to the first switching device and the third switching device. The second pixel electrode is spaced apart from the first pixel electrode.

In a method of driving a display apparatus according to an exemplary embodiment of the present invention, a first electric potential of a first pixel electrode and a second electric potential of a second pixel electrode are converted to a third electric potential between the first electric potential and the second electric potential in response to a previous gate signal for a previous pixel during a later H/2 period of a previous 1 H period for which the adjacent pixel is operative. The first and second pixel electrodes correspond to a current pixel. A first data signal having the second electric potential is applied to the first pixel electrode having the third electric potential in response to a first gate signal during an earlier H/2 period of a current 1 H period for which the current pixel is operative. A second data signal having the first electric potential is applied to the second pixel electrode having the third electric potential in response to a second gate signal during a later H/2 period of the current 1 H period.

The present invention will become readily apparent to those of ordinary skill in the art when descriptions of exemplary embodiments thereof are read with reference to the accompanying drawings.

BRIEF DESCRIPTION OF THE DRAWINGS

FIGS. 2A to 2D are cross-sectional views showing the array substrate shown in FIG. 1.

FIGS. 5 and 6 are cross-sectional views showing a liquid crystal display apparatus operable in a dual-pixel switching mode according to an exemplary embodiment of the present invention.

DESCRIPTION OF EXEMPLARY EMBODIMENTS

Figure 1:
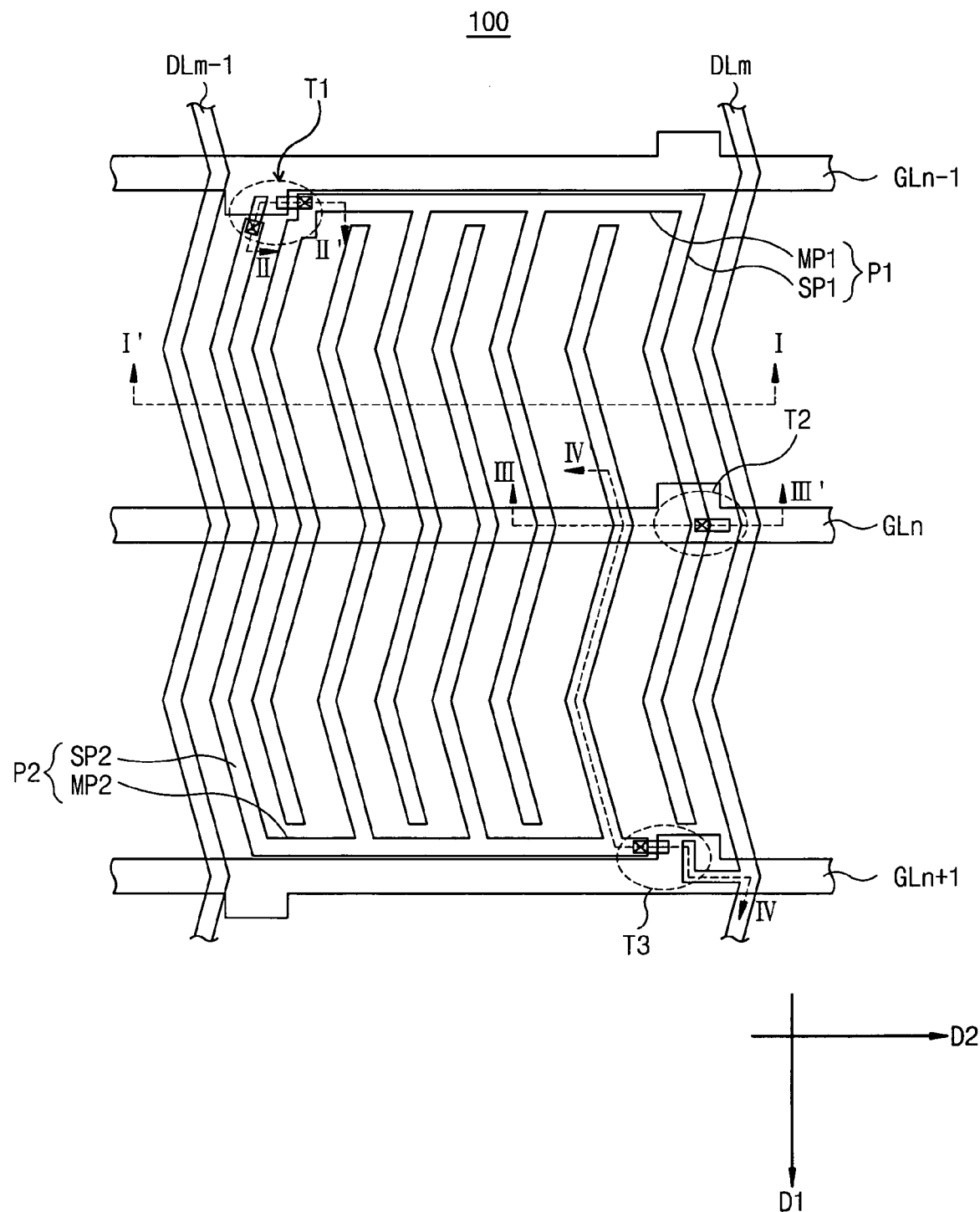
FIG. 1 shows a layout view of an array substrate according to an exemplary embodiment of the present invention.

Hereinafter, exemplary embodiments of the present invention will be described in detail with reference to the accompanying drawings. Like reference numerals refer to similar or identical elements throughout the description of the figures. As used herein, "aperture ratio" refers to the ratio between the transmissive portion of the pixel and its surrounding electronics.

Figure 2A:
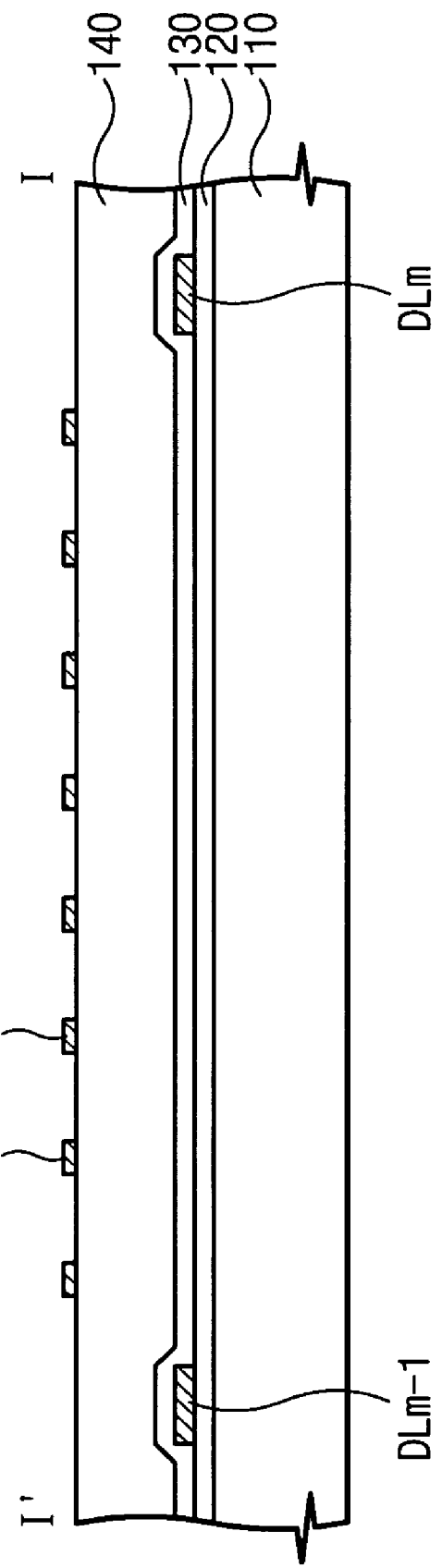
Figure 2C:
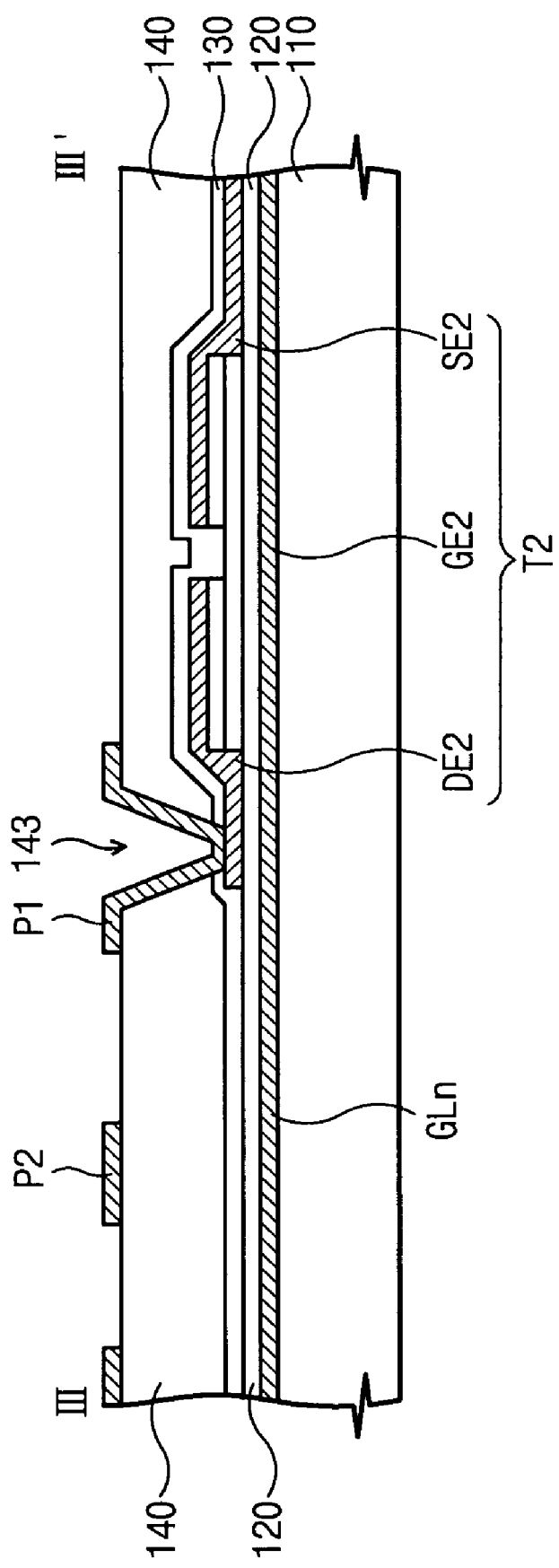
Figure 2D:
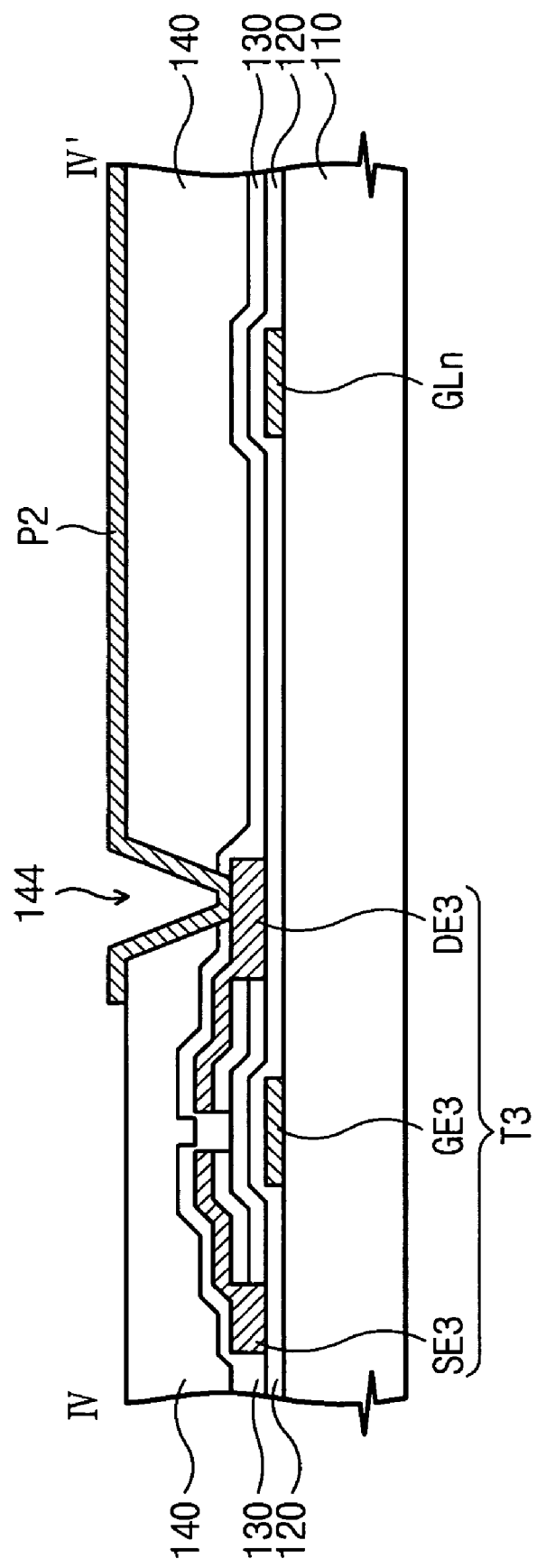

FIG. 1 shows a layout view of an array substrate according to an exemplary embodiment of the present invention. FIG. 2A is a cross-sectional view taken along a line I-I' in FIG. 1. FIG. 2B is a cross-sectional view taken along a line II-II' in FIG. 1. FIG. 2C is a cross-sectional view taken along a line III-III' in FIG. 1. FIG. 2D is a cross-sectional view taken along a line IV-IV' in FIG. 1.

Referring to FIGS. 1 and 2A, an array substrate 100 includes a lower base substrate 110 and a plurality of pixels formed on the lower base substrate 110. In an exemplary embodiment of the present invention, each of the pixels formed on the lower base substrate 110 has the same function and structure. In the interests of clarity and simplicity, only a single pixel will be described.

A pixel, according to an exemplary embodiment of the present invention, includes an m-th data line DLm, an n-th gate line GLn, an (n+1)th gate line GLn+1, a first switching device T1, a second switching device T2, a third switching device T3, a first pixel electrode P1 and a second pixel electrode P2. The m-th data line DLm is extended along a first direction D1 and the n-th and (n+1)th gate lines GLn+1 are extended along a second direction D2 substantially perpendicular to the first direction D1. An (m−1)th data line DLm−1, which is substantially parallel with the m-th data line, and an (n−1)th gate line GLn−1, which is substantially parallel with the n-th gate line, are disposed adjacent to the pixel. The m-th data line DLm and (m−1)th data line DLm−1 form a zigzag shape.

The first switching device T1 is electrically connected to the (n−1)th gate line GLn−1. For example, the first switching device T1 includes a gate electrode branched from the (n−1)th gate line GLn−1, a source electrode electrically connected to the first pixel electrode P1 and a drain electrode electrically connected to the second pixel electrode P2. The second switching device T2 is electrically connected to the m-th data line DLm and the n-th gate line GLn. For example, the second switching device T2 includes a gate electrode branched from the n-th gate line GLn, a source electrode branched from the m-th data line DLm and a drain electrode electrically connected to the first pixel electrode P1. The third switching device T3 is electrically connected to the m-th data line DLm and the (n+1)th gate line GLn+1. For example, the third switching device T3 includes a gate electrode branched from the (n+1)th gate line GLn+1, a source electrode branched from the m-th data line DLm and a drain electrode electrically connected to the second pixel electrode P2.

The first and second pixel electrodes P1 and P2 are spaced apart from and electrically insulated from each other. In an exemplary embodiment of the present invention, the first and second pixel electrodes P1 and P2 include a transparent conductive material. The transparent conductive material may comprise indium tin oxide (ITO) and/or indium zinc oxide (IZO).

The first pixel electrode P1 includes a first main electrode MP1 and a plurality of first sub electrodes SP1. The first main electrode MP1 is extended along the second direction D2, and the first sub electrodes SP1 are branched from the first main electrode MP1 and extended along the first direction D1. The second pixel electrode P2 includes a second main electrode MP2 and a plurality of sub electrodes SP2. The second main electrode MP2 is extended along the second direction D2, and the second sub electrodes SP2 are branched from the second main electrode MP2 and extended along the first direction D1. Each of the first sub electrodes SP1 is disposed between two second sub electrodes SP2 adjacent to each other. For example, the first and second sub electrodes SP1 and SP2 are alternately arranged along the second direction D2. The first and second sub electrodes SP1 and SP2 may be extended along a direction parallel with the m-th data line DLm to form zigzag shape.

In the array substrate 100, according to an exemplary embodiment of the present invention, the number of pixels arranged in the second direction D2 is about three times larger than the number of pixels arranged in the first direction D1.

As shown in FIG. 2A, a gate insulating layer 120 is formed on the lower base substrate 110 to cover the (n−1)th, n-th and (n+1)th gate lines GLn−1, GLn and GLn+1 and the gate electrodes of FIG. 1. The m-th and (m−1)th data lines DLm and DLm−1 are formed on the gate insulating layer 120.

A passivation layer 130 is formed on the gate insulating layer 120 to cover the m-th and (m−1)th data lines DLm and DLm−1, the source electrodes and the drain electrodes of FIG. 1. The passivation layer 130 may include a silicon nitride layer (SiNx) or a silicon oxide layer (SiOx). An organic insulating layer 140 may be formed on the passivation layer 130. In an exemplary embodiment of the present invention, the first and second pixel electrodes P1 and P2 are formed on the organic insulating layer 140 such that the first and second pixel electrodes P1 and P2 are spaced apart from each other.

FIG. 2B is a cross-sectional view taken along a line II-II' in FIG. 1. Referring to FIG. 2B, the first switching device T1 includes a gate electrode GE1, a source electrode SE1 and a drain electrode DE1. A first contact hole 141 is formed through the passivation layer 130 and the organic insulating layer 140 to expose the source electrode SE1. A second contact hole 142 is formed through the passivation layer 130 and the organic insulating layer 140 to expose the drain electrode DE1. The first pixel electrode P1 formed on the organic insulating layer 140 is electrically connected to the source electrode SE1 via the first contact hole 141, and the second pixel electrode P2 formed on the organic insulating layer 140 is electrically connected to the drain electrode DE1 via the second contact hole 142.

FIG. 2C is a cross-sectional view taken along a line III-III' in FIG. 1. Referring to FIG. 2C, the second switching device T2 includes a gate electrode GE2, a source electrode SE2 and a drain electrode DE2. The gate electrode GE2 is branched from the n-th gate line GLn, and the source electrode SE2 is branched from the m-th data line DLm. A third contact hole 143 is formed through the passivation layer 130 and the organic insulating layer 140 to expose the drain electrode DE2 of the second switching device T2. The first pixel electrode P1 formed on the organic insulating layer 140 is electrically connected to the drain electrode DE2 via the third contact hole 143.

FIG. 2D is a cross-sectional view taken along a line IV-IV' in FIG. 1. Referring to FIG. 2D, the third switching device T3 has a gate electrode GE3, a source electrode SE3 and a drain electrode DE3. A fourth contact hole 144 is formed through the passivation layer 130 and the organic insulating layer 140 to expose the drain electrode DE3 of the third switching device T3. The first pixel electrode P2 formed on the organic insulating layer 140 is electrically connected to the drain electrode DE3 via the fourth contact hole 144.

Figure 3:
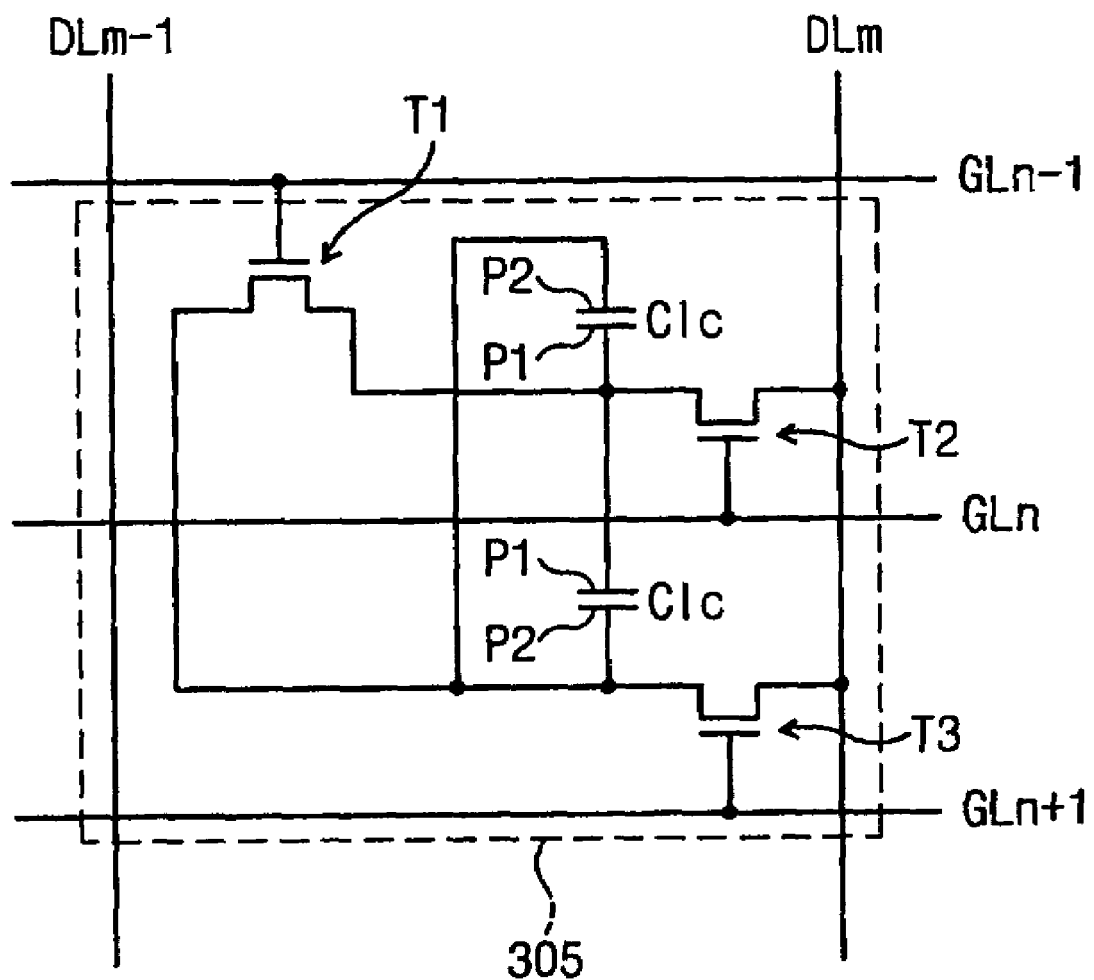
FIG. 3 is an equivalent circuit diagram of a pixel of the array substrate shown in FIG. 1.
Figure 4:
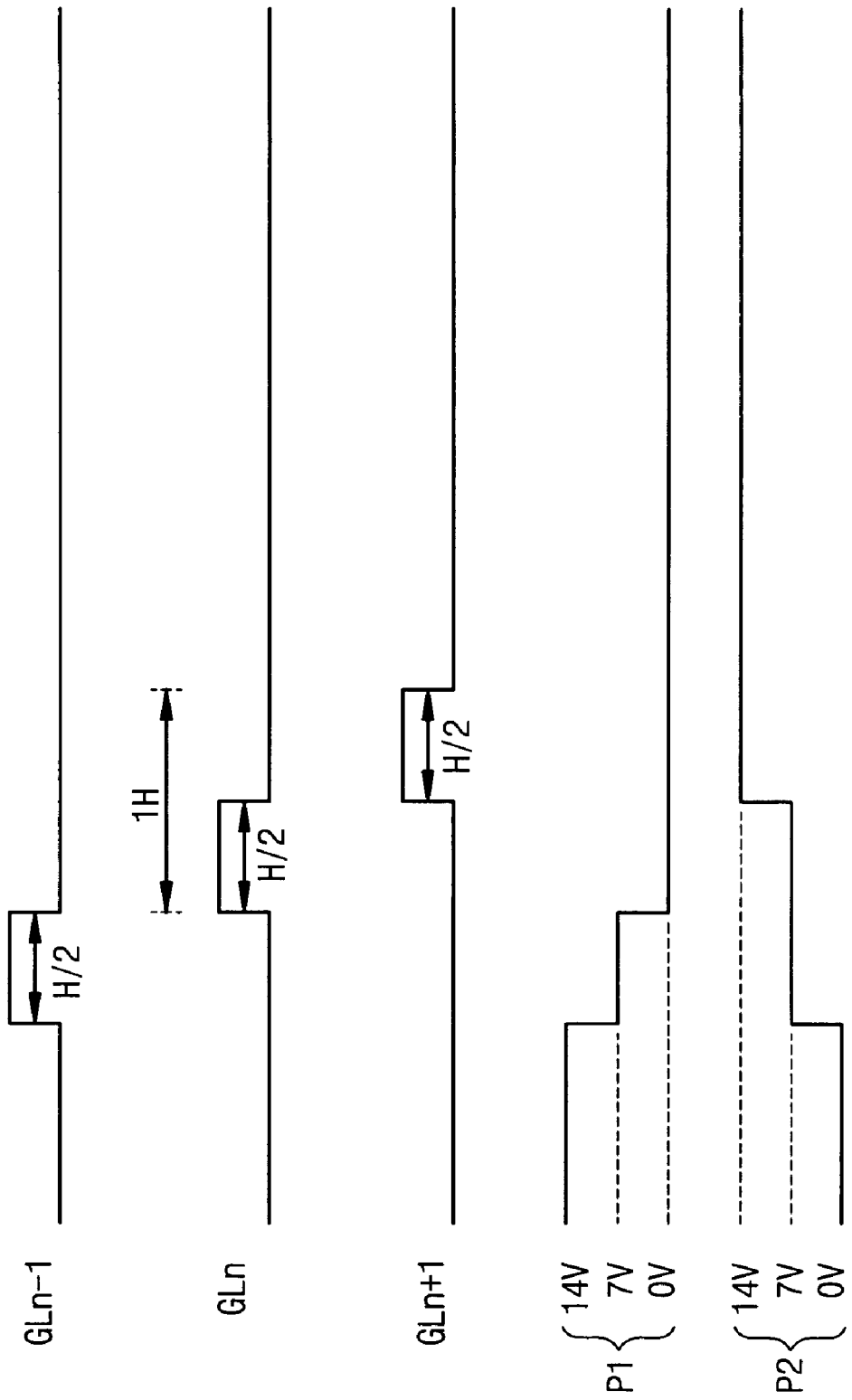
FIG. 4 is a waveform diagram showing input/output signals of the pixel shown in FIG. 3.

FIG. 3 is an equivalent circuit diagram of a pixel 305 of the array substrate shown in FIG. 1. FIG. 4 is a waveform diagram showing input/output signals of the pixel shown in FIG. 3.

Referring to FIGS. 3 and 4, the first and second pixel electrodes P1 and P2 corresponding to the pixel 305 have a different electric potential in response to a first data voltage and a second data voltage applied during a previous frame. For example, when the first pixel electrode P1 corresponding to the pixel 305 has a higher electric potential than that of the second pixel electrode P2 corresponding to the pixel 305 during the previous frame, the first pixel electrode P1 corresponding to the pixel 305 has a lower electric potential than that of the second pixel electrode P2 corresponding to the pixel 305 during a current frame. In the an exemplary embodiment of the present invention, the first pixel electrode P1 has an electric potential of about 14 volts during the previous frame, and the second pixel electrode P2 has an electrical potential of about 0 volts during the previous frame.

In the current frame, a previous gate voltage is applied to the (n−1)th gate line GLn−1 during a later H/2 of a 1 H time. For example, in the case when the number of gate lines is about 640, the 1 H time is about 26.04 microseconds. A first switching device T1 corresponding to the pixel 305 is turned on in response to the previous gate voltage for an adjacent pixel. The first and second pixel electrodes P1 and P2 are electrically connected to each other by the first switching device T1, and thus the first pixel electrode P1 is at an electric potential substantially equal to the electric potential of the second pixel electrode P2. The electric potentials of the first and second pixel electrodes P1 and P2 may have an intermediate value between the first and second data voltages. In an exemplary embodiment of the present invention, the first and second pixel electrodes P1 and P2 corresponding to the pixel 305 may have an electric potential of about 7 volts during the later H/2 period of the previous 1 H period.

A first gate voltage is applied to the n-th gate line GLn during an earlier H/2 period of a current 1 H period in which the pixel 305 is operative. The second switching device T2 corresponding to the pixel 305 provides the first data voltage applied to the m-th data line DLm to the first pixel electrode P1 in response to the first gate voltage. The first pixel electrode P1 may have an electric potential of about 0 volts.

A second gate voltage is applied to the (n+1)th gate line GLn+1 during a later H/2 period of the current 1 H period. The third switching device T3 corresponding to the pixel 305 provides the second data voltage applied to the m-th data line DLm to the second pixel electrode P2 in response to the second gate voltage. The second data voltage has a difference electric potential from that of the first data voltage, and the second pixel electrode P2 has an electric potential of about 14 volts.

As described above, the first and second pixel electrodes P1 and P2 corresponding to the pixel 305 may be pre-charged with about 7 volts before the pixel 305 is turned on, and then when the pixel 305 is turned on, the electric potentials of the first and second pixel electrodes P1 and P2 are changed to about 0 volts and about 14 volts, respectively. In this case, the electric potential variations of the first and second pixel electrodes P1 and P2 decrease to about Δ7 volts from about Δ14 volts, reducing the delay time. In exemplary embodiment of the present invention, capacitance of the liquid crystal capacitor Clc defined by the first and second pixel electrodes P1 and P2 may be improved.

Figure 5:
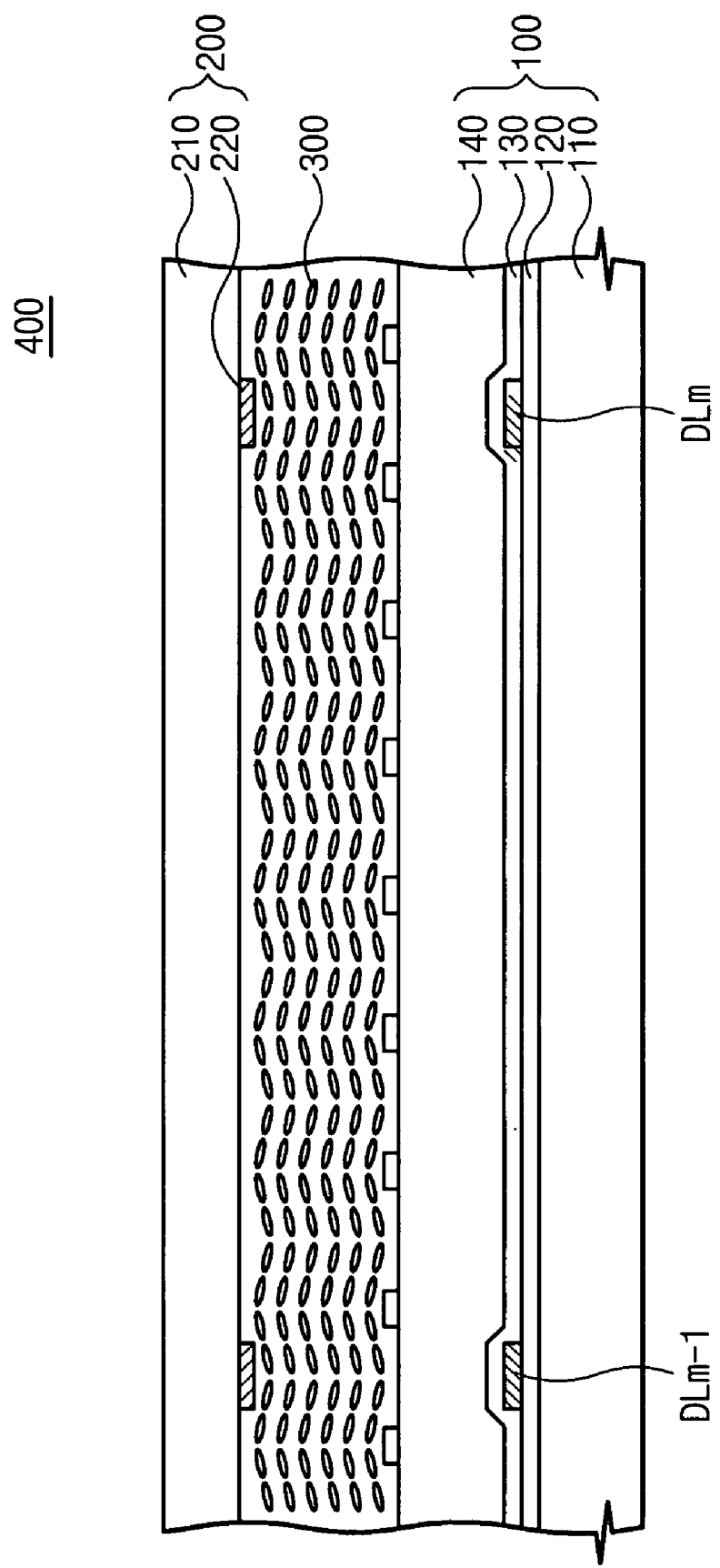

FIGS. 5 and 6 are cross-sectional views showing a liquid crystal display apparatus operable in a dual-pixel switching mode according to an exemplary embodiment of the present invention. FIG. 5 is a cross-sectional view corresponding to the array substrate shown in FIG. 2A, and FIG. 6 is a cross-sectional view corresponding to the array substrate shown in FIG. 2D. In FIGS. 5 and 6, elements that are the same as elements described in connection with FIGS. 2A and 2D are labeled with the same reference numerals, and descriptions of the common elements are omitted from the following description.

Referring to FIGS. 5 and 6, a liquid crystal display apparatus 400 operable in a dual-pixel switching (DPS) mode includes an array substrate 100, a facing substrate 200 opposite to the array substrate 100, and a liquid crystal layer 300 interdisposed between the array substrate 100 and the facing substrate 200.

The facing substrate 200 comprises an upper base substrate 210 and a black matrix 220 formed on the upper base substrate 210. The black matrix 220 is formed corresponding to the non-effective display areas of the array substrate 100. The array substrate 100 is divided into effective display areas to display images thereon and the non-effective display areas arranged between and adjacent to the effective display areas. Gate lines, data lines and switching devices are formed on the array substrate corresponding to the non-effective display areas. Accordingly, no images are substantially displayed in the non-effective display areas.

The n-th gate line GLn is overlapped with the second pixel electrode P2 in the pixel. A parasitic capacitance between the n-th gate line GL and the second pixel electrode P2 is determined in accordance with a distance between the n-th gate line GL and the second pixel electrode P2. For example, when the parasitic capacitance increases, an area in which liquid crystal molecules adjacent to the n-th gate line GLn are abnormally aligned is enlarged. The width of a black matrix 220 formed on the facing substrate 200 may be increased to cover the enlarged area.

As shown in FIG. 6, an organic insulating layer 140 is formed between the n-th gate line GLn and the second pixel electrode P2, and the parasitic capacitance may be reduced. In accordance with an exemplary embodiment of the present invention, the width of the black matrix 220 is decreased, and the aperture ratio of the DPS mode liquid crystal display apparatus 400 may be improved.

As described above, each of pixels of the array substrate according to an exemplary embodiment of the present invention includes two gate lines, one data line, three switching devices and two pixel electrodes, and the two pixel electrodes may be provided with different voltages. Since each of the pixels in an exemplary embodiment of the present invention comprises one data line, the aperture ratio of the display apparatus may be improved.

In an exemplary embodiment of the present invention, the voltages of the first and second pixel electrodes corresponding to the pixel 305 are changed to the electric potential difference between the voltages of the first and second pixel electrodes while the adjacent pixel is operative, and the time needed to charge the pixel electrode to a required voltage level may be reduced, improving the response speed of the display apparatus.

Although the exemplary embodiments of the present invention have been described in detail with reference to the accompanying drawings for the purpose of illustration, it is to be understood that the inventive processes and apparatus should not be construed as limited thereby. It will be readily apparent to those of reasonable skill in the art that various modifications to the foregoing exemplary embodiments can be made without departing from the scope of the invention as defined by the appended claims, with equivalents of the claims to be included therein.

What is claimed is:

1. An array substrate comprising:
   a base substrate; and
   a plurality of pixels on the base substrate, wherein each pixel comprises:
   a data line;
   a first gate line crossing and electrically insulated from the data line;
   a second gate line crossing and electrically insulated from the data line, the second gate line being spaced apart from the first gate line;
   a first switching device electrically connected to a previous gate line corresponding to a previous pixel;
   a second switching device electrically connected to the first gate line and the data line;
   a third switching device electrically connected to the second gate line and the data line;
   a first pixel electrode electrically connected to the first switching device and the second switching device; and
   a second pixel electrode electrically connected to the first switching device and the third switching device, the second pixel electrode being spaced apart from the first pixel electrode,
   wherein the first switching device is connected between the first and second pixel electrodes, and the first and second pixel electrodes are electrically connected to each other by the first switching device when the first switching device is turned on.

2. The array substrate of claim 1, wherein the first switching device comprises:
   a gate electrode electrically connected to the previous gate line of the previous pixel to receive a previous gate signal for the previous pixel;
   a source electrode electrically connected to the first pixel electrode; and
   a drain electrode electrically connected to the second pixel electrode.

3. The array substrate of claim 2, wherein the first switching device is turned on in response to the previous gate signal, and wherein the first pixel electrode has an electric potential substantially equal to an electric potential of the second pixel electrode.

4. The array substrate of claim 3, wherein the first switching device is turned off after the second switching device is turned on.

5. The array substrate of claim 1, wherein the second switching device comprises:
   a gate electrode electrically connected to the first gate line to receive a first gate signal;
   a source electrode electrically connected to the data line to receive a first data signal having a first electric potential; and
   a drain electrode electrically connected to the first pixel electrode to apply the first data signal to the first pixel electrode.

6. The array substrate of claim 5, wherein the third switching device comprises:
   a gate electrode electrically connected to the second gate line to receive a second gate signal;
   a source electrode electrically connected to the data line to receive a second data signal having a second electric potential different from the first electric potential; and
   a drain electrode electrically connected to the second pixel electrode to apply the second data signal to the second pixel electrode.

7. The array substrate of claim 6, wherein the second switching device is turned on during an earlier H/2 period of a current 1H period that a current pixel is operative, and the third switching device is turned on during a later H/2 period of the current 1H period.

8. The array substrate of claim 6, wherein the first switching device is turned on during a later H/2 period of a previous 1H period that the previous pixel is operative to change the first and second electric potentials of the first and second pixel electrodes to a third electric potential between the first electric potential and the second electric potential.

9. The array substrate of claim 8, wherein the third electric potential has an intermediate value between the first electric potential and the second electric potential.

10. The array substrate of claim 6, wherein polarities of the first data signal and the second data signal that are applied to the first and second pixel electrodes, respectively, are inverted every frame.

11. The array substrate of claim 1, wherein the first pixel electrode comprises:
    a first main electrode extended in parallel with the first and second gate lines; and
    a plurality of first sub electrodes branched from the first main electrode and extended in parallel with the data line, and
    the second pixel electrode comprises:
    a second main electrode extended in parallel with the first and second gate lines; and
    a plurality of second sub electrodes branched from the second main electrode and extended in parallel with the data line.

12. The array substrate of claim 11, wherein the first and second sub electrodes are alternately arranged in a direction in which the first gate line is extended.

13. The array substrate of claim 12, wherein the data line, the first sub electrodes and the second sub electrodes form a zigzag shape.

14. A display apparatus comprising:
    an array substrate having a plurality of pixels;
    a facing substrate opposite to the array substrate; and
    a liquid crystal layer between the array substrate and the facing substrate, wherein each pixel comprises:
    a data line;
    a first gate line crossing and electrically insulated from the data line;
    a second gate line crossing and electrically insulated from the data line, the second gate line being spaced apart from the first gate line;
    a first switching device electrically connected to a previous gate line corresponding to a previous pixel;
    a second switching device electrically connected to the first gate line and the data line;
    a third switching device electrically connected to the second gate line and the data line;
    a first pixel electrode electrically connected to the first switching device and the second switching device; and
    a second pixel electrode electrically connected to the first switching device and the third switching device, the second pixel electrode being spaced apart from the first pixel electrode, wherein the first switching device is connected between the first and second pixel electrodes, and the first and second pixel electrodes are electrically connected to each other by the first switching device when the first switching device is turned on.

15. The display apparatus of claim 14, wherein the first switching device comprises:
a gate electrode electrically connected to the previous gate line of the adjacent pixel to receive a previous gate signal for the previous pixel;
a source electrode electrically connected to the first pixel electrode; and
a drain electrode electrically connected to the second pixel electrode.

16. The display apparatus of claim 15, wherein the first switching device is turned on in response to the gate signal for the previous pixel, and wherein an electric potential of the first pixel electrode is substantially equal to an electric potential of the second pixel electrode.

17. The display apparatus of claim 14, wherein the second switching device comprises:
a gate electrode electrically connected to the first gate line to receive a first gate signal;
a source electrode electrically connected to the data line to receive a first data signal having a first electric potential; and
a drain electrode electrically connected to the first pixel electrode to apply the first data signal to the first pixel electrode.

18. The display apparatus of claim 17, wherein the third switching device comprises:
a gate electrode electrically connected to the second gate line to receive a second gate signal;
a source electrode electrically connected to the data line to receive a second data signal having a second electric potential different from the first electric potential; and
a drain electrode electrically connected to the second pixel electrode to apply the second data signal to the second pixel electrode.

19. The display apparatus of claim 18, wherein the second switching device is turned on during an earlier H/2 period of a current 1H period that a current pixel is operative, and the third switching device is turned on during a later H/2 period of the current 1H period.

20. The display apparatus of claim 18, wherein the first switching device is turned on during a later H/2 period of a previous 1H period that the previous pixel is operative to change the first and second electric potentials of the first and second pixel electrodes to a third electric potential that is between the first and second electric potentials.

21. The display apparatus of claim 18, wherein polarities of the first data signal and the second data signal that are applied to the first and second pixel electrodes, respectively, are inverted every frame.

22. A method of driving a display apparatus having a plurality of pixels, the method comprising:
converting a first electric potential of a first pixel electrode and a second electric potential of a second pixel electrode to a third electric potential that is between the first and second electric potentials in response to a previous gate signal for a previous pixel during a later H/2 period of a previous 1H period for which the previous pixel is operative, the first and second pixel electrodes corresponding to a current pixel;
applying a first data signal having the second electric potential to the first pixel electrode having the third electric potential in response to a first gate signal during an earlier H/2 period of a current 1H period for which the current pixel is operative; and
applying a second data signal having the first electric potential to the second pixel electrode having the third electric potential in response to a second gate signal during a later H/2 period of the current 1H period.

23. The method of claim 22, wherein the third electric potential has an intermediate value between the first electric potential and the second electric potential.

24. The method of claim 22, wherein polarities of the first data signal and the second data signal applied to the first and second pixel electrodes, respectively, are inverted every frame.

* * * * *